United States Patent
Ganfield et al.

(10) Patent No.: US 7,266,650 B2
(45) Date of Patent: Sep. 4, 2007

(54) METHOD, APPARATUS, AND COMPUTER PROGRAM PRODUCT FOR IMPLEMENTING ENHANCED CIRCULAR QUEUE USING LOOP COUNTS

(75) Inventors: Paul Allen Ganfield, Rochester, MN (US); Lonny Lambrecht, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 10/988,232

(22) Filed: Nov. 12, 2004

(65) Prior Publication Data
US 2006/0106749 A1 May 18, 2006

(51) Int. Cl.
*G06F 12/00* (2006.01)
(52) U.S. Cl. .................. 711/154; 711/109; 711/110; 710/54
(58) Field of Classification Search .................. None
See application file for complete search history.

(56) References Cited

U.S. PATENT DOCUMENTS

| | | | | |
|---|---|---|---|---|
| 6,131,113 A * | 10/2000 | Ellsworth et al. | ........... | 709/213 |
| 6,785,862 B1 * | 8/2004 | Zhang | ........... | 714/788 |
| 6,988,186 B2 * | 1/2006 | Eickemeyer et al. | ........ | 712/217 |
| 2003/0163660 A1 * | 8/2003 | Lam | ........... | 711/170 |
| 2005/0283577 A1 * | 12/2005 | Sivaram et al. | ............. | 711/152 |

* cited by examiner

*Primary Examiner*—Jasmine Song
(74) *Attorney, Agent, or Firm*—Joan Pennington

(57) ABSTRACT

A method, apparatus, and computer program product are provided for implementing an enhanced circular queue using loop counts for command processing. A circular queue includes a plurality of entries for storing commands. As command entries are added to the queue at the head of the queue, a head loop count is stored with each command entry. A head pointer is updated to the head of the queue. When the head pointer wraps from a last queue entry to a first queue entry, the head loop count is incremented. A tail pointer points to an oldest command entry, and is updated when the oldest command entry is executed. When the tail pointer advances and wraps from a last queue entry to a first queue entry, the tail pointer loop count is incremented.

9 Claims, 6 Drawing Sheets

FIG. 6

METHOD, APPARATUS, AND COMPUTER PROGRAM PRODUCT FOR IMPLEMENTING ENHANCED CIRCULAR QUEUE USING LOOP COUNTS

FIELD OF THE INVENTION

The present invention relates generally to the data processing field, and more particularly, relates to a method, apparatus, and computer program product for implementing enhanced circular queues using loop counts for command processing in a computer system.

DESCRIPTION OF THE RELATED ART

In conventional arrangements, a circular queue that allows some entries to be executed out of order will result in free queue entries that are located between the head and tail entries and thus cannot be used. This means that the circular queue appears full when fewer entries than its capacity are actually present in the queue.

Figure 2:
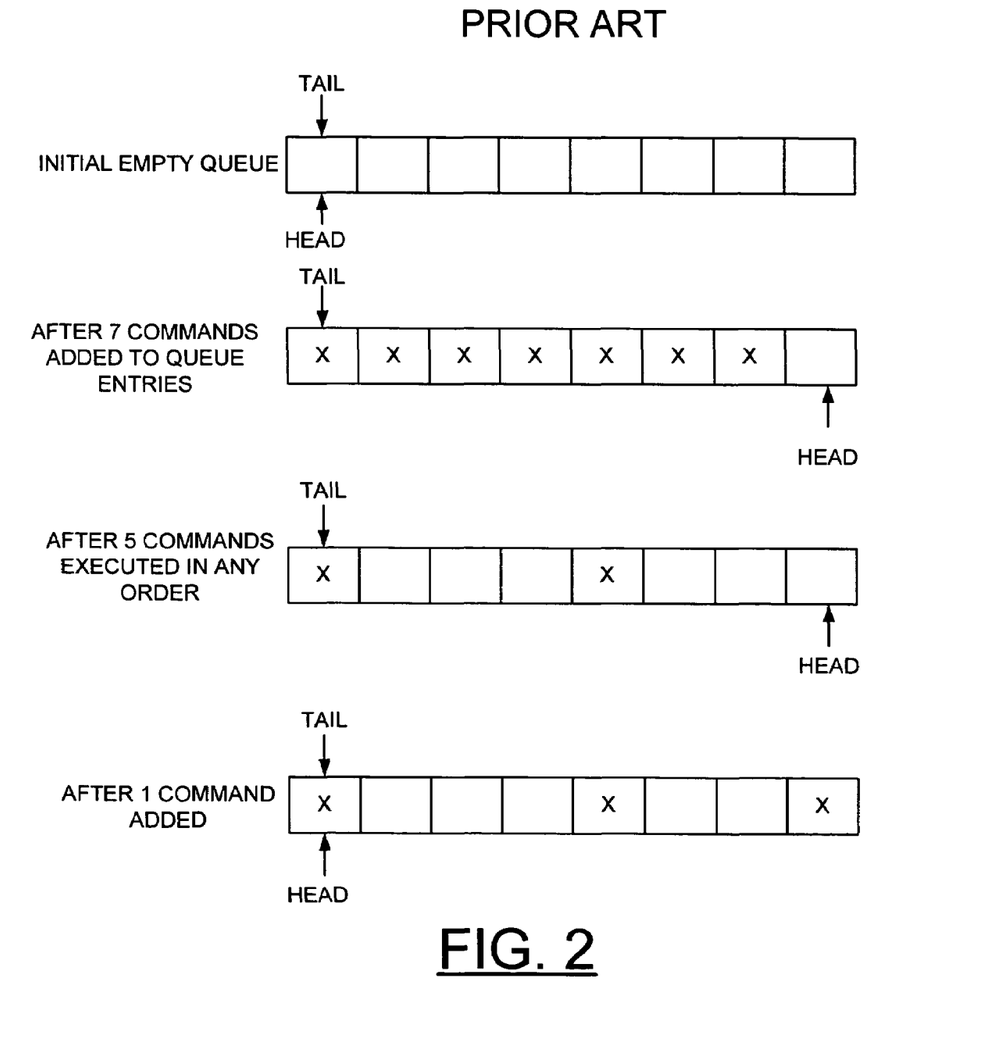
FIG. 2 illustrates a prior art circular queue structure including an initial empty queue and examples of how entries are enqueued and dequeued out of order resulting in free queue entries between the head and tail entries that cannot be used.

For example, FIG. 2 illustrates how entries are enqueued and dequeued with a convention arrangement of a circular queue. In FIG. 2, the circular queue includes eight (8) entries and an X indicated that a queue entry is being used. As shown in FIG. 2, the entries are added to the head of the queue and removed from the queue in any order. The tail pointer indicates the oldest entry in the queue.

First the circular queue starts empty with the head and tail pointers pointing to a first entry. The head pointer points to the head of the queue and the tail pointer points to the oldest entry in the queue.

Next the circular queue is shown after seven (7) commands have been received. After 7 commands have been received the tail pointer points to the first entry and the head pointer points to the last entry.

Then the circular queue is shown after five (5) commands have been executed in any order. After the 5 commands have been executed, the tail pointer points to the first entry that still is the oldest entry in the queue and the head pointer points to the last entry.

Next the circular queue is shown after another command has been received and added to the last entry in the queue. Then the head pointer wraps to point to the first entry and the tail pointer still points to the first entry. After the illustrated last command is received, the queue appears full even though 5 entries are unused.

A linked list can be used instead of a circular queue that avoids such a problem. However, a linked list would require substantially more hardware than a circular queue.

A need exists for an effective mechanism for implementing a circular queue that enables processing enqueued commands in any order and that allows free queue entries to be used that otherwise would be unavailable with convention circular queue arrangements. It is desirable to provide such a mechanism that enables effective use of a circular queue without requiring additional hardware and complexity of a linked list.

SUMMARY OF THE INVENTION

Principal aspects of the present invention are to provide a method, apparatus, and computer program product for implementing enhanced circular queues using loop counts in a computer system, such as in a memory controller. Other important aspects of the present invention are to provide such method, apparatus, and computer program product for implementing enhanced circular queues using loop counts substantially without negative effect and that overcome many of the disadvantages of prior art arrangements.

In brief, a method, apparatus, and computer program product are provided for implementing an enhanced circular queue using loop counts for command processing. A circular queue includes a plurality of entries for storing commands. As command entries are added to the queue at the head of the queue, a head loop count is stored with each added command entry. A head pointer is updated to the head of the queue with each added command entry. When the head pointer wraps from a last queue entry to a first queue entry, the head loop count is incremented. A tail pointer points to an oldest command entry, and is updated when the oldest command entry is executed. When the tail pointer advances and wraps from a last queue entry to a first queue entry, the tail pointer loop count is incremented.

In accordance with features of the invention, the use of loop counts enables out-of-order command processing and effective use of all available entries in the circular queue.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
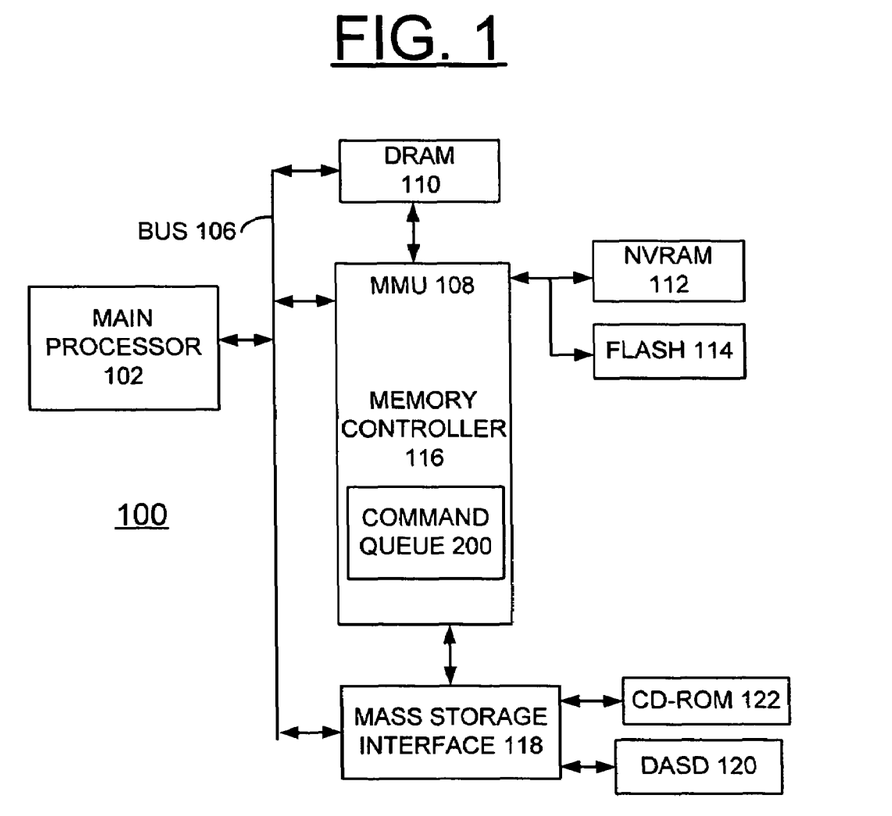
FIG. 1 is a block diagram representation illustrating a computer system for implementing enhanced circular queues using loop counts in accordance with the preferred embodiment.

Referring now to the drawings, in FIG. 1 there is shown a computer system generally designated by the reference character 100 for implementing enhanced circular queues using loop counts in accordance with the preferred embodiment. Computer system 100 includes a processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 118 coupled to the system bus 106 and a memory controller 116 of the MMU 108 connects a direct access storage device (DASD) 120 and a CD-ROM drive 122 to the processor 102. Memory controller 116 enqueues and dequeues commands in a circular queue 200 using loop counts in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices. It should be understood that the present invention is not limited to use in the illustrated computer system 100, various processor systems can provide a computing environment in which the methods and enhanced circular queue structure of the preferred embodiments of the invention advantageously are implemented.

Processor 102 can be implemented with various standard processors, for example, with one of the PowerPC® line of processors manufactured by International Business Machines Corporation.

In accordance with features of the preferred embodiment, commands are enqueued and dequeued in the circular queue 200 using loop counts in accordance with the preferred embodiment to enable the commands to be executed in any order, while allowing all free queue entries in the circular queue 200 to be used for storing new commands.

In accordance with features of the preferred embodiment, as command entries are added to the queue at the head of the queue, a head loop count is stored with each command entry. A head pointer is updated to the head of the queue. When the head pointer wraps from a last queue entry to a first queue entry, the head loop count is incremented. A tail pointer points to an oldest command entry, and is updated when the oldest command entry is executed. When the tail pointer advances and wraps from a last queue entry to a first queue entry, the tail pointer loop count is incremented. The head pointer with the head loop count value is compared to the tail pointer and tail loop count value to identify a full condition for the circular queue 200, and the queue is considered full when the head loop pointer would need to advance to the tail loop pointer with matching loop counts for the head and tail pointers.

Figure 3:
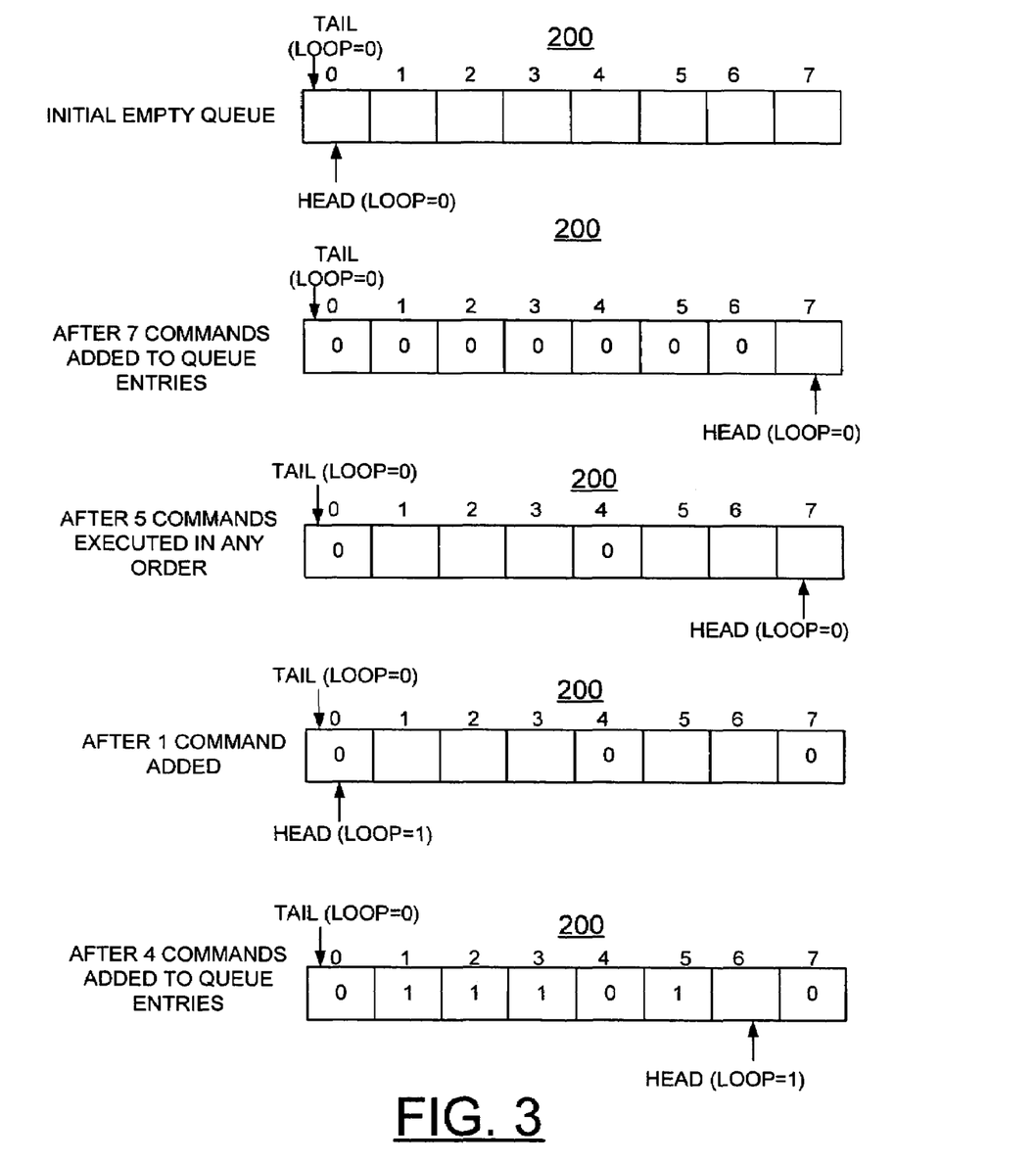
FIG. 3 illustrates an exemplary queue sequence for implementing enhanced circular queues using loop counts in accordance with the preferred embodiment in the network processor system of FIG. 1.
Figure 4:
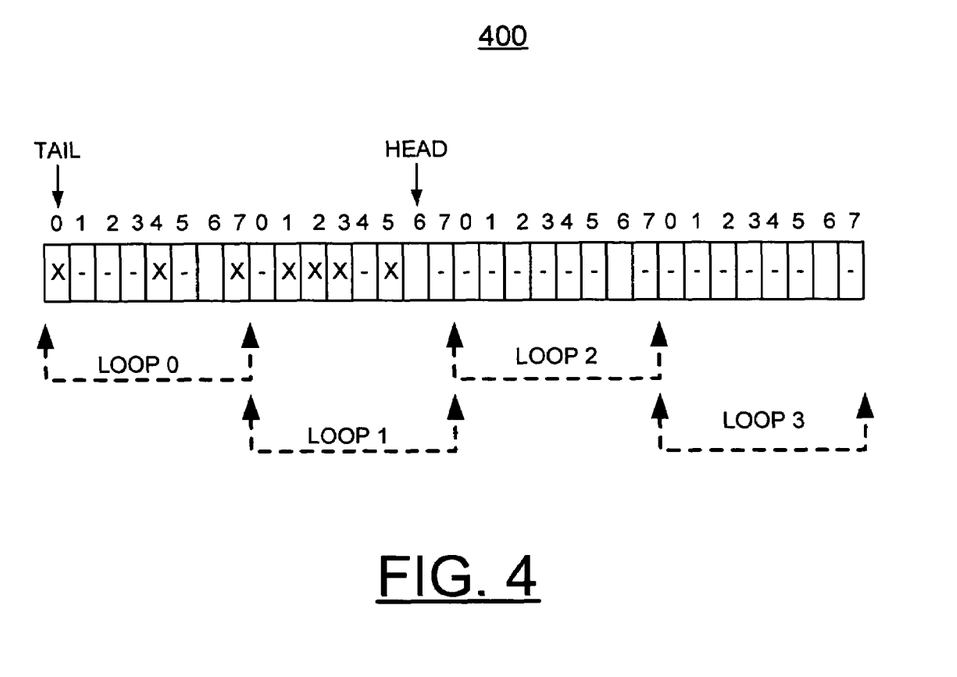
FIG. 4 is an alternative representation of an exemplary queue structure for implementing enhanced circular queues using loop counts in accordance with the preferred embodiment in the computer system of FIG. 1 that shows this queue structure after the last four commands are received as shown in the exemplary queue sequence of FIG. 3.

Referring now to FIGS. 3 and 4, there are shown exemplary queue diagrams illustrating command queue entry processing using loop counts in accordance with the preferred embodiment.

FIG. 3 illustrates an exemplary initial queue structure generally designated by the reference character 200 in the processor system 100 in accordance with the preferred embodiment. As shown, the initial queue structure 200 includes eight (8) empty entries 0-7 with the head and tail pointers pointing to a first entry 0, both the head and tail pointers having a loop count of 0. The head pointer points to the head of the queue and the tail pointer points to the oldest entry in the queue. The loop count is represented by a multiple bit value. For example, the loop count includes 3 bits, for eight (8) loops through the circular queue 200; or 2 bits, for four (4) loops through the circular queue 200.

Next the circular queue 200 is shown after seven (7) commands have been received and added to the circular queue 200. A number 0 shown in the queue entries 0-6 indicates the queue entries 0-6 are in use and the number 0 indicates the loop count value. After 7 commands have been received the tail pointer points to the first entry 0 indicating the oldest command and the head pointer is updated and points to the last entry 7 for adding a next command.

Then the circular queue 200 is shown after five (5) commands have been executed. After the 5 commands have been executed, the tail pointer points to the first entry and the head pointer points to the last entry.

Next the circular queue 200 is shown after another command has been received and added to the last entry 7 that was pointed to by the head pointer. Then the head pointer is updated and the head pointer wraps to point to the first entry and the tail pointer points to the first entry. The head loop count value is incremented when head pointer wraps advancing from the last queue entry to the first entry. The head loop count value is incremented to 1, as shown with the head pointer, while the tail pointer loop count value remains 0. After this command is received, the circular queue 200 does not appear full as occurs with the conventional command circular queue. By comparing the count values of the head pointer and tail pointer, the remaining five free entries 1, 2, 3, 5 and 6 now are unused.

As shown at the bottom of the illustrated sequence of FIG. 3, the circular queue 200 is shown after another 4 commands are added. These 4 commands are added in order to the first four of the remaining five free entries 1, 2, 3, and 5. The head pointer (head loop count value of 1) is updated and points to the single remaining free entry 6 for adding a next command. The tail pointer (loop count of 0) indicates the oldest command entry 1 in the queue.

FIG. 4 provides an alternative representation of an exemplary queue structure generally designated by the reference character 400 for implementing enhanced circular queues using loop counts in accordance with the preferred embodiment in the computer system 100 after the last four commands are received in the illustrated sequence of exemplary queue 200 of FIG. 3. As illustrated in FIG. 4, the circular queue 200 is represented as one large queue structure 400 with 32 entries, or 8 entries times the four loops 0-3. As illustrated in FIG. 4, the queue structure 400 includes eight (8) entries for each loop 0-3. As shown in FIG. 4, the head pointer points to the head of the queue for adding a next command and the tail pointer indicates the oldest entry in the queue. As illustrated in FIG. 4, the queue structure 400 allows a queue entry 0-7 to be used in only one loop 0-3. An X indicates that a queue entry is being used and a—indicates that queue entry is blocked because only one slot is available for all the loops 0-3.

Figure 5:
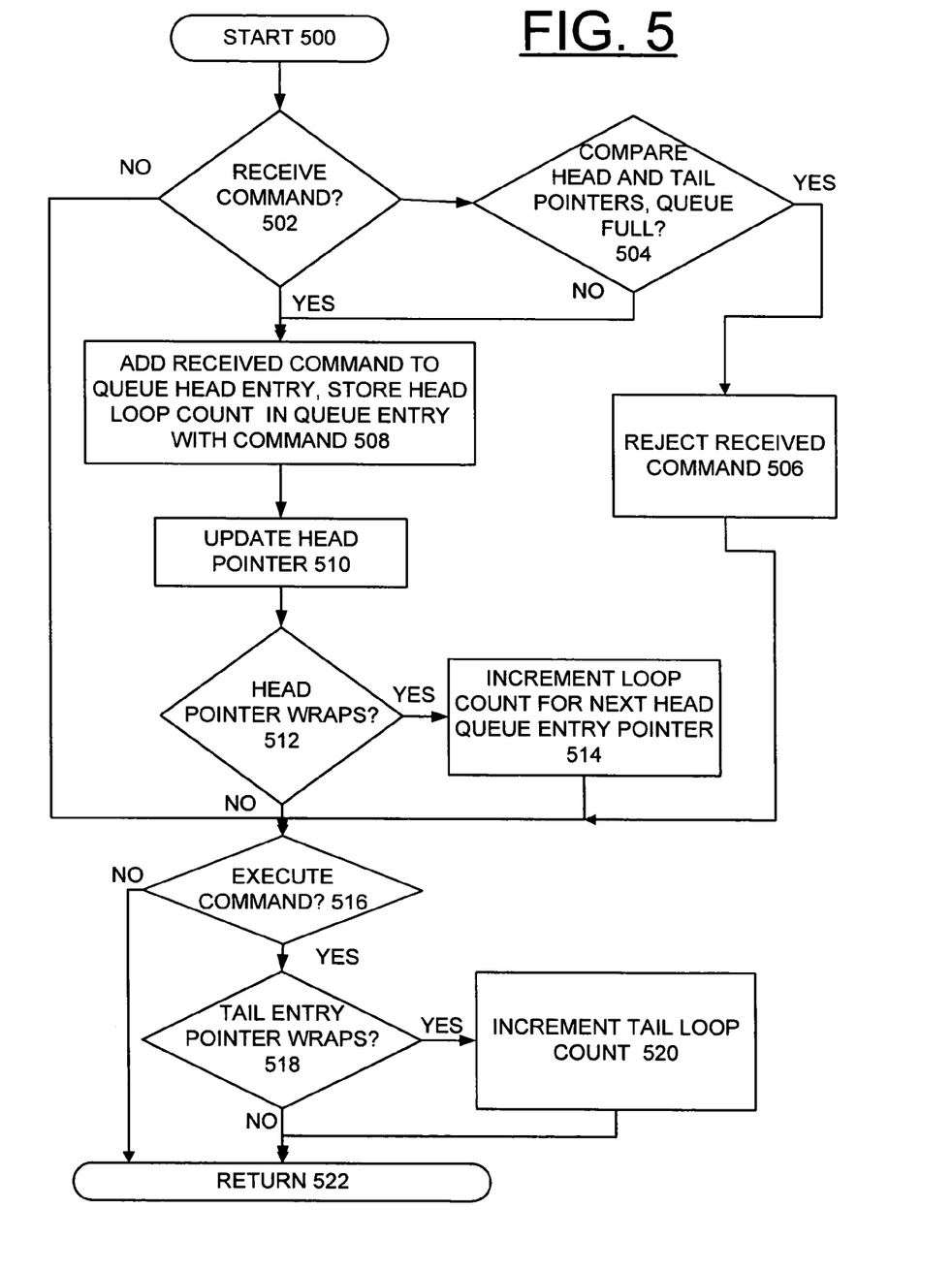
FIG. 5 is a flow chart illustrating exemplary steps for implementing enhanced circular queues using loop counts in accordance with the preferred embodiment in the computer system of FIG. 1.

Referring now to FIG. 5, there are shown exemplary steps for implementing enhanced circular queues using loop counts in accordance with the preferred embodiment in the computer system 100 starting at a block 500. As indicated in a decision block 502, when a command is received, comparing the head pointer including the head loop count value to the tail pointer and tail loop count value to identify a full condition for the circular queue 200 is performed as indicated in a decision block 504. When the head loop pointer would need to advance to the tail loop pointer with matching loop counts for the head and tail pointers a full queue is identified at decision block 504, then the received command is rejected as indicated in a block 506.

When the queue is not full, then the received command is added to the queue head entry and the head loop count is stored in the queue entry with the command as indicated in a block 508. The head pointer is updated to point to the queue head entry for a next command as indicated in a block 510. Checking whether the head pointer wraps or advances past a last queue entry and a first queue entry is performed as indicated in a decision block 512. The loop count for the next queue head entry and the head pointer is incremented when the head pointer wraps as indicated in a block 514.

When a received command is not identified at decision block 502, then checking for an executed command is performed as indicated in a decision block 516. When an executed command is identified at decision block 516, the tail entry pointer is advanced when the executed command is the oldest command entry. Checking whether the tail entry pointer wraps is performed as indicated in a decision block 518. When tail entry pointer wraps, the loop count for the tail entry pointer is incremented as indicated in a block 520. Then sequential steps return as indicated in a block 522.

While the present invention has been described with queue entries being added to the head of the queue and the tail pointer pointing to an oldest command entry, it should be understood that queue entries can be added to the tail of the queue and the head pointer pointing to an oldest command entry in accordance with the present invention.

Figure 6:
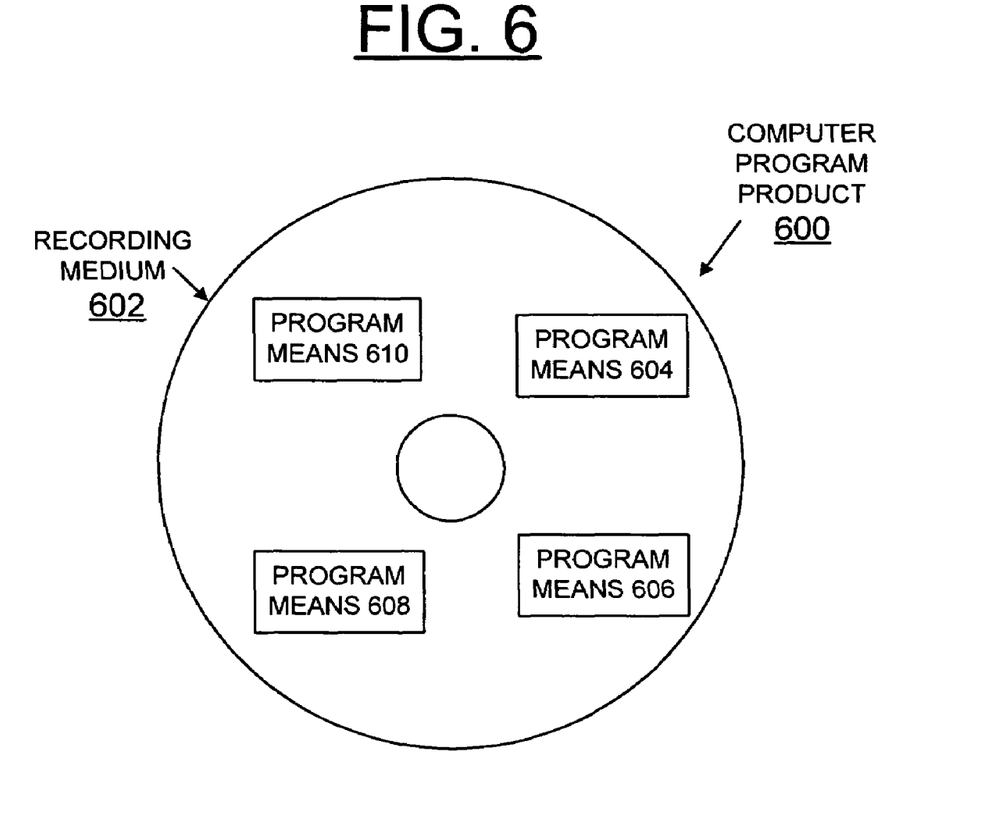
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing an enhanced circular queue for command processing of the preferred embodiment in the computer 100 of FIG. 1.

A sequence of program instructions or a logical assembly of one or more interrelated modules defined by the recorded program means 604, 606, 608, 610, direct the computer system 100 for implementing an enhanced circular queue for command processing of the preferred embodiment.

While the present invention has been described with reference to the details of the embodiments of the invention shown in the drawing, these details are not intended to limit the scope of the invention as claimed in the appended claims.

What is claimed is:

1. A method for implementing an enhanced circular queue for command processing comprising the steps of:
   providing a circular queue including a plurality of entries for storing commands;
   adding a command entry at a head entry of the circular queue and storing a head loop count with the command entry being added to the circular queue;
   updating a head pointer for pointing to a next head entry in the circular queue; and responsive to the head pointer wrapping from a last queue entry to a first queue entry, incrementing the head loop count;
   providing a tail pointer for pointing to an oldest command entry and storing a tail loop count, and advancing the tail pointer when each oldest command entry is executed; and responsive to the tail pointer wrapping from the last queue entry to the first queue entry, incrementing the tail loop count for the tail pointer; and
   comparing the updated head pointer including the head loop count to the tail pointer including the tail loop count value to identify a full circular queue.

2. A method for implementing an enhanced circular queue for command processing as recited in claim 1 wherein the step of storing a head loop count with the command entry includes the step of storing a multiple bit value to represent the head loop count.

3. A method for implementing an enhanced circular queue for command processing as recited in claim 1 includes the steps of executing any command entry from the circular queue.

4. Apparatus for implementing an enhanced circular queue for command processing comprising:
   a circular queue including a plurality of entries for storing commands;
   a memory controller coupled to said circular queue for storing commands; said memory controller adding a command entry at a head entry of the circular queue and storing a head loop count with the command entry being added to the circular queue;
   said memory controller updating a head pointer for pointing to a next head entry in the circular queue; and responsive to the head pointer wrapping from a last queue entry to a first queue entry, incrementing the head loop count;
   said memory controller providing a tail pointer for pointing to an oldest command entry and storing a tail loop count, and advancing the tail pointer when each oldest command entry is executed; and responsive to the tail pointer wrapping from the last queue entry to the first queue entry, incrementing the tail loop count for the tail pointer and
   said memory controller said memory controller comparing the updated head pointer including the head loop count to the tail pointer including the tail loop count value to identify a full circular queue.

5. Apparatus for implementing an enhanced circular queue for command processing as recited in claim 4 wherein said memory controller stores a multiple bit value in each command entry representing the head loop count.

6. Apparatus for implementing an enhanced circular queue for command processing as recited in claim 4 wherein said memory controller executes the command from any command entry from the circular queue.

7. A computer program product for implementing an enhanced circular queue for command processing in a computer system, said computer program product including a plurality of computer executable instructions stored on a computer readable medium, consisting one of a floppy disk, a high capacity read only memory in the form of an optically read compact disk or CD-ROM, a tape wherein said instructions, when executed by the computer system, cause the computer system to perform the steps of:
   providing a circular queue including a plurality of entries for storing commands;
   adding a command entry at a head entry of the circular queue and storing a head loop count with the command entry being added to the circular queue;
   updating a head pointer for pointing to a next head entry in the circular queue; and responsive to the head pointer wrapping from a last queue entry to a first queue entry, incrementing the head loop count;
   providing a tail pointer for pointing to an oldest command entry and storing a tail loop count, and advancing the tail pointer when each oldest command entry is executed; and responsive to the tail pointer wrapping from the last queue entry to the first queue entry, incrementing the tail loop; and
   comparing the updated head pointer including the head loop count to the tail pointer including the tail loop count value to identify a full circular queue.

8. A computer program product for implementing an enhanced circular queue for command processing as recited in claim 7 includes the steps of: executing any command entry from the circular queue.

9. A computer program product for implementing an enhanced circular queue for command processing as recited in claim 7 wherein the step of storing a head loop count with the command entry includes the step of storing a multiple bit value to represent the head loop count.

* * * * *